No. 871,806. PATENTED NOV. 26, 1907.
J. G. LEEP.
IMPLEMENT FOR CUTTING GRASS.
APPLICATION FILED AUG. 21, 1907.
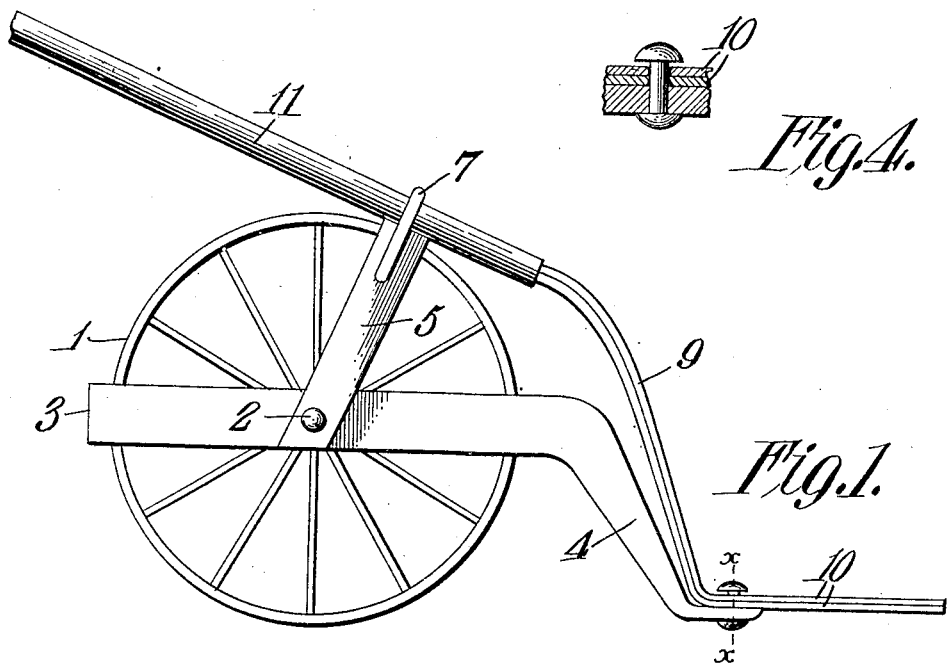
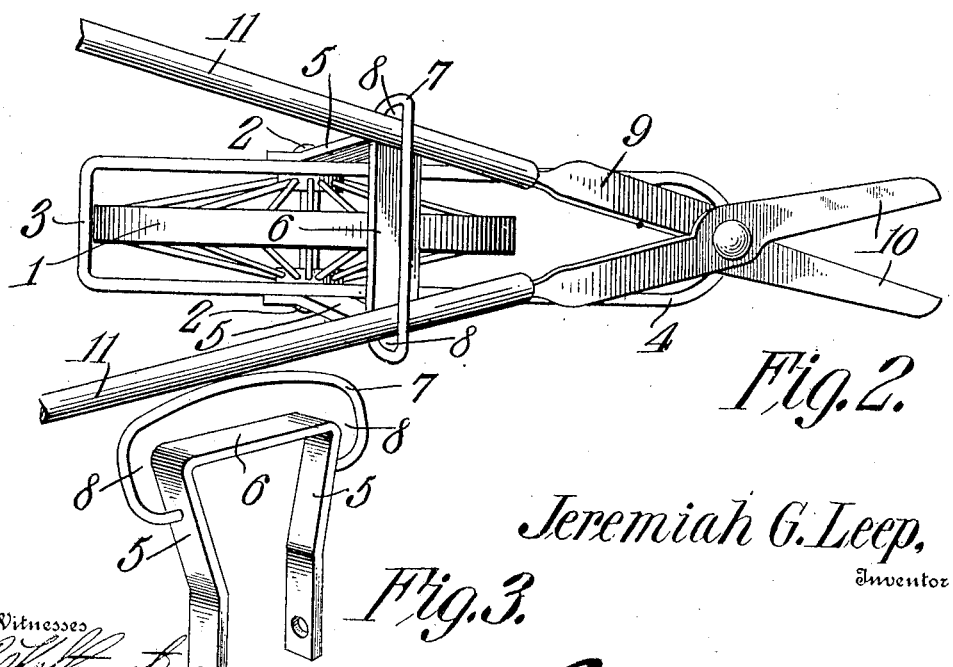
Jeremiah G. Leep,
Inventor

UNITED STATES PATENT OFFICE.

JEREMIAH G. LEEP, OF VEVAY, INDIANA.

IMPLEMENT FOR CUTTING GRASS.

No. 871,806.  Specification of Letters Patent.  Patented Nov. 26, 1907.

Application filed August 21, 1907. Serial No. 389,527.

To all whom it may concern:

Be it known that I, JEREMIAH G. LEEP, a citizen of the United States, residing at Vevay, in the county of Switzerland and State of Indiana, have invented a new and useful Implement for Cutting Grass, of which the following is a specification.

This invention relates to implements for cutting grass and is more particularly designed for trimming the edges of lawns and cutting grass at places which can not be easily reached with the usual cutting implements.

Another object is to provide a device of this character which can be operated by a person in an erect position.

A still further object is to provide a trimming device which is of light, durable, and efficient construction and which can be conveniently manipulated.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation. Fig. 2 is a plan view. Fig. 3 is a perspective view of the guide. Fig. 4 is an enlarged section on line x—x, Fig. 1.

Referring to the figures by characters of reference, 1 designates the supporting wheel of the axle 2 on which is mounted a substantially rectangular frame 3 extending around the wheel and having its front portion extending downward and forward as shown at 4. Upstanding from the frame 3 and adjacent the axle 2 is a supporting loop 5 the upper portion of which is enlarged to constitute a rest and guide as will be hereinafter set forth. A retaining member 7 is disposed above the rest 6 and has its ends inturned and secured to the sides of the loop, thereby producing recesses or sockets 8 at opposite sides of the rest 6. Pivotally mounted upon the front portion 4 of the frame are crossed shanks 9 and from the lower end of each shank extends a shear blade 10. These blades extend forward from the shanks and may be of any suitable size and proportions.

Secured to and extending from the upper portions of the shanks 9 are elongated handles 11 which extend between the rest 6 and the retaining member 7 and are designed to be grasped at their upper or rear ends by the person operating the implement.

The normal positions of the handles 11 are within the sockets 8 and when so disposed the blades 10 can not move in relation to each other. In cutting grass the operator pushes the implement forward with the blades 10 close to the ground and lifts the handles 11 out of sockets 8 so that they assume positions above the rest 6. The handles can then be moved toward and from each other so as to produce a corresponding movement of the blade. Wheel 1 assumes the entire weight of the device so that the same can be readily moved from place to place without fatiguing the operator. Shanks 9 are loosely mounted upon their pivot so as to permit the slight movement necessary to swing the handles 11 into or out of the socket 3. As heretofore stated when the implement is not in use the handles can be placed in the sockets.

What is claimed is:

1. An implement of the character described comprising a frame, a single wheel therein and supporting the same, cutting blades pivotally mounted upon and extending forward from the frame, handles connected to and extending rearwardly from the blades, and a guide above the wheel and upon the frame.

2. An implement of the character described comprising a frame, a single supporting wheel mounted therein, shanks pivotally connected to the front end of the frame, cutting blades extending forward therefrom, handles extending rearwardly from the shank, a guide upon the frame and above the wheel, said guide constituting a rest for the handles, and a retaining member above the guide and handles.

3. An implement of the character described comprising a frame, a single supporting wheel mounted therein, said frame having a downwardly and forwardly extending front portion, shanks pivotally mounted upon said portion, cutting blades extending forward therefrom, handles extending rearwardly from the shanks, a yoke secured upon the frame and extending over the wheel, the upper portion of said yoke being enlarged and constituting a rest and guide for the handles, and a retaining member above the yoke, said member and yoke forming handle receiving sockets at the sides of the yoke.

In testimony that I claim the foregoing as my own, I have hereto affixed my signature in the presence of two witnesses.

JEREMIAH G. LEEP.

Witnesses:
ALBERT G. CRAIG,
CHARLES C. SHAW.